(12) United States Patent  
Sayre

(10) Patent No.: US 8,902,969 B1  
(45) Date of Patent: *Dec. 2, 2014

(54) HOME-VIDEO DIGITAL-MASTER PACKAGE

(71) Applicant: Pixar, Emeryville, CA (US)

(72) Inventor: Rick Sayre, Kensington, CA (US)

(73) Assignee: Pixar, Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,827

(22) Filed: Jan. 6, 2014

Related U.S. Application Data

(63) Continuation of application No. 12/032,547, filed on Feb. 15, 2008, now Pat. No. 8,625,663.

(60) Provisional application No. 60/980,169, filed on Oct. 15, 2007, provisional application No. 60/890,810, filed on Feb. 20, 2007.

(51) Int. Cl.

| | | |
|---|---|---|
| *H04N 11/02* | (2006.01) | |
| *H04N 9/87* | (2006.01) | |
| *H04N 19/86* | (2014.01) | |
| *H04N 9/873* | (2006.01) | |

(52) U.S. Cl.  
CPC ....... *H04N 19/00909* (2013.01); *H04N 9/8707* (2013.01); *H04N 9/873* (2013.01)  
USPC .................................................. 375/240.01

(58) Field of Classification Search  
USPC ........ 375/240–240.01, 240.12; 348/453, 448, 348/450, 642; 382/232, 167; 345/428, 619, 345/591; 358/408, 1.2  
See application file for complete search history.

(56) References Cited

U.S. PATENT DOCUMENTS

| | | | |
|---|---|---|---|
| 5,784,116 A | 7/1998 | Pan et al. | |
| 6,069,712 A | 5/2000 | Dellert et al. | |
| 6,870,547 B1 | 3/2005 | Crosby et al. | |
| 6,912,039 B2 | 6/2005 | Patton et al. | |
| 7,110,605 B2 * | 9/2006 | Marcellin et al. | 382/232 |
| 2003/0081177 A1 | 5/2003 | Rosen | |

(Continued)

FOREIGN PATENT DOCUMENTS

WO 2006/050305 5/2006

OTHER PUBLICATIONS

Marcelin et al, JPEG2000 for Digital Cinema, 2006.

(Continued)

*Primary Examiner* — Michael Thier  
*Assistant Examiner* — Vincelas Louis  
(74) *Attorney, Agent, or Firm* — Kilpatrick Townsend & Stockton LLP

(57) ABSTRACT

A method for determining digital video data includes receiving digital data comprising a plurality of digital images, wherein each digital image is encoded in a first color space, determining a plurality of color-graded digital images in response to the plurality of digital images and in response to color grading input data, wherein each color-graded digital image is encoded in a second color space, and wherein the second color space is associated with HD video, encoding each color-graded image with a compression encoding substantially independent of integer pixel translation of the plurality of color-graded digital images to form encoded image data package, storing the encoded image data package in a tangible media, and determining the digital video data for a video display device in a remote server in response to the encoded image data package.

20 Claims, 9 Drawing Sheets

(56) References Cited

U.S. PATENT DOCUMENTS

| | | |
|---|---|---|
| 2003/0185302 A1 | 10/2003 | Abrams, Jr. |
| 2003/0187674 A1 | 10/2003 | Odgers et al. |
| 2004/0201593 A1* | 10/2004 | Nishimura et al. ........... 345/591 |
| 2004/0213542 A1 | 10/2004 | Hamasaka et al. |
| 2004/0264565 A1 | 12/2004 | MacInnis |
| 2005/0018911 A1 | 1/2005 | Deever |
| 2005/0053152 A1 | 3/2005 | Raveendran et al. |
| 2007/0291179 A1* | 12/2007 | Sterling et al. ................ 348/642 |
| 2008/0013827 A1 | 1/2008 | Cordes et al. |
| 2008/0301054 A1 | 12/2008 | Russell et al. |
| 2010/0231593 A1 | 9/2010 | Zhou et al. |

OTHER PUBLICATIONS

Digital Cinema Initiatives, LLC, "Digital Cinema Systems Specification V. 1.0," Jul. 20, 2005, located at v1.pdf>, 176 pages.

International Search Report mailed on Jun. 26, 2008, for PCT Application No. PCT/US08/54322 filed on Feb. 19, 2008, 2 pages.

* cited by examiner

| 1 | 1 | 0 | 0 | 1 | 1 | 0 | 0 | 1 | 1 | 0 | 0 | 1 | 1 |
|---|---|---|---|---|---|---|---|---|---|---|---|---|---|
| 1 | 1 | 0 | 0 | 1 | 1 | 0 | 0 | 1 | 1 | 0 | 0 | 1 | 1 |
| 0 | 0 | 1 | 1 | 0 | 0 | 1 | 1 | 0 | 0 | 1 | 1 | 0 | 0 |
| 0 | 0 | 1 | 1 | 0 | 0 | 1 | 1 | 0 | 0 | 1 | 1 | 0 | 0 |
| 1 | 1 | 0 | 0 | 1 | 1 | 0 | 0 | 1 | 1 | 0 | 0 | 1 | 1 |
| 1 | 1 | 0 | 0 | 1 | 1 | 0 | 0 | 1 | 1 | 0 | 0 | 1 | 1 |
| 0 | 0 | 1 | 1 | 0 | 0 | 1 | 1 | 0 | 0 | 1 | 1 | 0 | 0 |
| 0 | 0 | 1 | 1 | 0 | 0 | 1 | 1 | 0 | 0 | 1 | 1 | 0 | 0 |
| 1 | 1 | 0 | 0 | 1 | 1 | 0 | 0 | 1 | 1 | 0 | 0 | 1 | 1 |
| 1 | 1 | 0 | 0 | 1 | 1 | 0 | 0 | 1 | 1 | 0 | 0 | 1 | 1 |

ORIGINAL TO BE COMPRESSED

| 1 | 0 | 1 | 0 | 1 | 0 |
|---|---|---|---|---|---|
| 0 | 1 | 0 | 1 | 0 | 1 |
| 1 | 0 | 1 | 0 | 1 | 0 |
| 0 | 1 | 0 | 1 | 0 | 1 |

COMPRESSED ORIGINAL

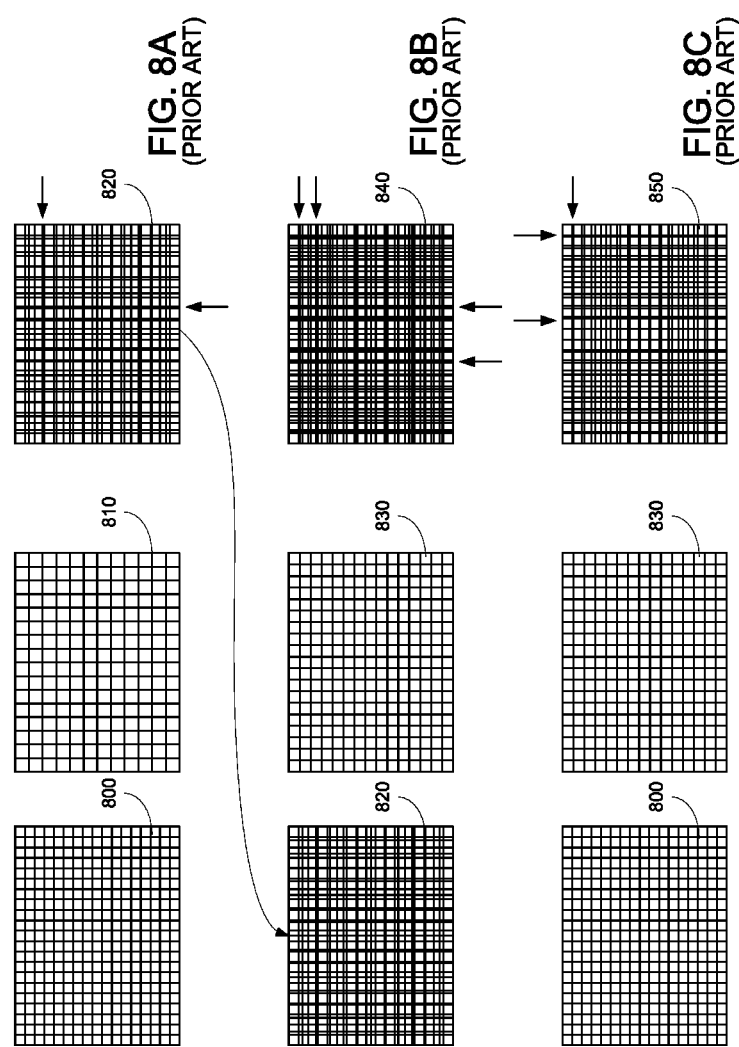

HOME-VIDEO DIGITAL-MASTER PACKAGE

CROSS-REFERENCES TO RELATED APPLICATIONS

This application is a Continuation of application Ser. No. 12/032,547, filed Feb. 15, 2008, which application claims the benefit and priority under 35 U.S.C. 119(e) from U.S. Provisional Application No. 60/890,810, filed Feb. 20, 2007, and U.S. Provisional Application No. 60/980,169, filed Oct. 15, 2007, the disclosures of which are each hereby incorporated by reference in its entirety for all purposes.

BACKGROUND OF THE INVENTION

The present invention relates to the field of digital media distribution. More specifically, the present invention relates to a high quality video encoding termed a "Home-Video Digital-Master Package" (HVP).

Video and audio content, such as movies and television shows, are beginning to become widely available for viewing on a variety of digital media devices. The HVP allows video content source providers to encode video data into a variety of formats for a variety of devices with reduced artifacts. Digital media devices include computers, set-top video boxes, digital video recorders, mobile phones, personal digital assistants, DVD players, and handheld or portable video players (e.g., iPhone, Zune, iPod).

Digital distribution uses data communications networks, such as the Internet, local area networks, local or wide-area terrestrial or satellite wireless networks, cellular data networks, and other open or proprietary networks to distribute content to digital media devices. Digital media devices can download content via a data communications networks on demand during viewing, referred to as streaming, and/or for storage in advance of later viewings.

Currently, there is a large amount of content already digitally mastered for distribution via DVD, digital broadcasting, or more recently, digital television broadcasting. However, for such data to be prepared for digital media devices, the digitally mastered content must typically be further processed and encoded. The file sizes for digitally-mastered content are often very large compared to the bandwidth available on data communications networks. Further, the file size also typically exceeds the data storage capacities of digital media devices. Accordingly, digitally-mastered content is often compressed for digital distribution purposes. Digital media devices typically use any standard or proprietary data compression known in the art, e.g., MPEG-2, DiVX, or the like.

Digital media devices, especially portable and handheld devices, often have relatively low resolution displays compared with the resolution of the digitally mastered content. Furthermore, the pixel aspect ratios of digital media devices can differ from the pixel aspect ratio used to digitally master content. For example, many computers and other digital media devices use square pixels (e.g., 1:1), while DVD format video typically have a non-square pixel aspect ratio of 0.9:1.0. Thus, digitally mastered content must often be resized to account for differences in resolution and pixel aspect ratio between the digital master version of the content and the display formats of digital media devices.

Due to the variety of different standard formats used for generating and distributing digital master versions of content and the plethora of different resolutions, pixel aspect ratios, and compression formats required by digital media devices, the content encoded for digital media devices by current digital distribution techniques is often low quality. In particular, digital distribution systems may compress, decompress, and recompress content multiple times using different data compression schemes. Because typical digital distribution systems and digital media devices typically rely on lossy data compression schemes; quality is reduced and compression artifacts are introduce every time the content is compressed. By compressing content multiple times, digital distribution systems often exacerbate compression artifacts and substantially reduce the quality of content for digital media devices.

As merely an example, the inventor of the present invention has studied the quality of the video being displayed on digital media devices. Many artifacts of such video are determined to be caused by one or more of the intermediate conversion steps between film format to hand-held device format. In a specific example, a traditional acetate film media is scanned with a film scanner (e.g., telecine) to form digital video data (e.g., 720×480 pixels); next, the digital video data is typically encoded into MPEG2 format (e.g., for DVDs) (e.g., 720×480 pixels); the MPEG2 encoded DVD resolution data is then provided to a video content providing service (e.g., iTunes). Subsequently, the video content providing service first decodes the MPEG2 format video; then resizes the 720×480 pixel resolution video to the target resolution (e.g., 640×480, 320×480, etc.); and then recompresses the video in the desired encoding scheme (e.g., H.264 for iTunes).

FIGS. 8A-C illustrate a prior art problem. More specifically, FIGS. 8A-C illustrate the problem of multiple resizing of video content upon a source image. FIG. 8A illustrates source image having a first image resolution 800 to be resized to a second image resolution 810. Because of differences in resolution, a resulting image 820 will often have a number of "beat frequencies" shown as dark lines in resulting image 820. In one example, in FIG. 8A, the source image may be a be a high resolution image, e.g., 1960×1080 resolution, and second resolution 810 may be 720×480 resolution. Next, FIG. 8B illustrates resulting image 820 being resized to a third image resolution 830. Because of additional differences in resolution, a resulting image 840 will often have an additional number of "beat frequencies" shown as additional dark lines in resulting image 840. In one example, in FIG. 8B, the third image resolution 810 may be 640×480. In contrast, in FIG. 8C, the inventors of the present invention recognize that direct resizing from the source image having first resolution 800 to third image resolution 830 results in resulting image 850 with reduced "beat frequencies." In this example, resulting image 850 includes fewer dark lines compared to resulting image 840.

Additionally, in one specific example, because MPEG2 encoding for the DVD resolution image uses blocks of 8×8 pixels, the edges of many of the encoding blocks become visible as vertical and horizontal lines when resizing the video images to 640×480. Another problem is that the video images are encoded and decoded multiple times, causing a degradation in the colors. In the example above, the digital video data is encoded using MPEG2, is decoded, and then re-encoded to H.264.

FIGS. 7A-D illustrate another prior art drawback. More specifically, FIGS. 7A-C illustrate a problem with typical block-based, or shift-intolerant encoding or compression schemes. FIG. 7A illustrates an image 700 including data to be compressed by a block-based compression scheme, such as MPEG2. In FIG. 7A, each group of four pixels is used to determine a pixel value in a compressed image. In the example in FIG. 7B, an image 710 illustrates the resulting compressed image reproducing the checker board-type pattern.

In FIG. 7C, image 720 illustrates image 700, however, the grouping of four pixels used to determine a pixel value is shifted vertically and horizontally by one pixel. An example of where this may happen is when scanning film media. It is virtually impossible to guarantee scanning at the same position of each image because of film printing and duplication registration errors, scanning misalignments, or the like. In light of this, scanned film images often are shifted for different images as shown in FIGS. 7A and 7C.

In the example in FIG. 7C an image 730 illustrates the compressed image determined from image 720 in FIG. 7C. As can be seen, the data values in image 730 are uniformly 0.5, in contrast, the data values in image 710 (FIG. 7B) vary from 1 to 0 in a checkerboard-type pattern. Accordingly, if a viewer were to view image 710 and 730 in succession, the viewer would see the output images flicker and go to gray on the screen due simply to the compression scheme being shift-intolerant, e.g., block-based.

It is therefore desirable for a system and method to provide the highest-quality content possible for digital media devices regardless of their display requirements. It is further desirable for a system and method to simplify the process of converting content for digital media devices. It is also desirable for a system and method to integrate easily with both legacy content sources, including film-based content sources, and more recent digital sources. Further, the inventors desire a method for providing service providers with video content that will have fewer visual artifacts when resized and/or encoded in a desired format.

BRIEF SUMMARY OF THE INVENTION

The present invention relates to high quality video encoding. More specifically, the present invention relates to high quality video encoding for a variety of destinations with reduced artifacts. In the present disclosure, the term video refers to temporally-coherent or ordered set of images.

Various embodiments of the present invention includes determining a device-independent color-space encoding of video data, encoding the video data using an encoding scheme substantially free of spatial organization, e.g., block-based encoding, and providing the processed video data to a video service provider.

In various embodiments, it is contemplated that a video service provider will change the resolution of the processed video data, and then encode the processed video data in the desired color space for the target hand-held device.

Various systems are contemplated for performing these steps. Additionally, various computer code executable on a computer system are also contemplated for instructing the computer system to perform these operations.

According to one aspect of the invention, methods for determining digital data are described. One technique may include receiving digital data comprising a plurality of digital images, wherein each digital image is encoded in a first color space (e.g., film media, digital cinema, X'Y'Z', DCDM), and determining a plurality of color-graded digital images in response to the plurality of digital images and in response to color grading input data, wherein each color-graded digital image is encoded in a second color space, and wherein the second color space is associated with HD video (e.g., ITU-R BT.709, ITU-R BT.601). A process may include encoding each color-graded image with a compression encoding substantially independent of integer pixel translation of the plurality of color-graded digital images to form encoded image data package (e.g., HVP), and storing the encoded image data package in a tangible media. Determining the digital video data (e.g., DVD, Blu-ray disc, HD disk, CD, downloadable data, a streaming data format) for a video display device in a remote server in response to the encoded image data package may also be performed.

According to another aspect of the invention, a computer system for forming an encoded image data package is described. One apparatus includes a memory configured to store digital data comprising a plurality of digital images, wherein each digital image is encoded in a first color space. A device may include a processor coupled to the memory, wherein the processor is configured to determine a plurality of color-graded digital images in response to the plurality of digital images and in response to color grading input data, wherein each color-graded digital image is encoded in a second color space, and wherein the second color space is associated with HD video, and wherein the processor is configured to encode each color-graded image with a compression encoding substantially independent of integer pixel translation of the plurality of color-graded digital images to form encoded image data package. In various embodiments, the memory is also configured to store the encoded image data package in a tangible media. A system may include a delivery means coupled to the memory, wherein the delivery means is configured to provide the encoded image data package to a remote server to determine digital video data, such as a network interface, a hard disk, a DVD writer, or the like.

According to yet another aspect of the invention, a computer program product comprising computer executable code resident on a tangible media, wherein the computer system comprises a processor and a memory is disclosed. The computer program product may include code configured to direct the processor to receive digital data comprising a plurality of digital images, wherein each digital image is encoded in a first color space, and code configured to direct the processor to determine a plurality of color-graded digital images in response to the plurality of digital images and in response to color grading input data, wherein each color-graded digital image is encoded in a second color space, wherein the second color space is associated with HD video. The computer program product may also include code configured to direct the processor to encode each color-graded image with a compression encoding substantially independent of integer pixel translation of the plurality of color-graded digital images to form encoded image data package, and code configured to direct the processor to store the encoded image data package in the memory.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIGS. 7A-D illustrate examples of problems with current techniques; and

FIGS. 8A-C illustrate additional examples of problems with current techniques.

DETAILED DESCRIPTION OF THE INVENTION

The inventor of the present invention introduces the concept of a "Home-Video Digital-Master Package" (HVP) for providing digital video data to video service providers. In various embodiments, the HVP includes video data that may be stored in a device independent color-space, and may be encoded in a compression scheme that does not depend upon geometry of the images (e.g., DCT blocks in MPEG2).

Typically, a movie or other content exists in the form of an original camera negative (OCN). This represents the master or original version of the content. Each time a film is run through a film printer or other device, there is a chance that the film may be damaged. To protect the integrity of the content, handling of the OCN is minimized. From the OCN, a positive film print, referred to as an interpositive or intermediate positive, is created. The interpositive may be created using special film stock. The interpositive is the highest quality copy of the content and is typically used to create other prints of the content or to digitally master the content.

To create prints of the content for distribution to theaters, one or more internegatives are created from the interpositive. The internegatives are negative versions of the interpositives. Internegatives are the second highest quality copy of the content. Each internegative is typically used to create many distribution prints, which are positive copies of the content for distribution to theaters.

Figure 1:
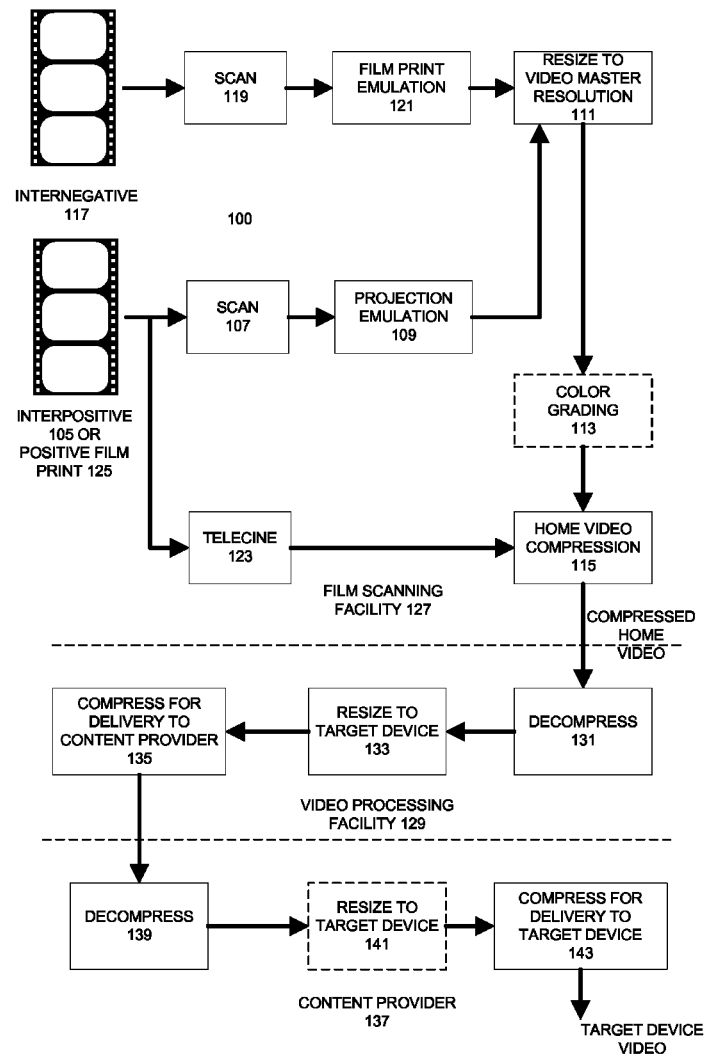
FIG. 1 illustrates a prior system for encoding content for digital media devices.

FIG. 1 illustrates a prior system 100 for encoding content for digital media devices. System 100 receives content in the form of a film of a movie, television show, or other type of content including video and optionally audio. For the highest quality encoding in prior systems, each frame of an interpositive print 105 is scanned 107. Projection emulation 109 transforms the scanned film images to account for the effects of film projection. The transformed scanned film images are resized 111 to a video master resolution, which is typically the resolution used by DVD players, such as 720×480 (NTSC) or 720×576 (PAL). The resizing stage 111 can also compensate for differences in frame rates and aspect ratios between the original content and the video master format.

The resized video may be optionally color graded 113 to correct the color and contrast and then compressed 115 for home video distribution, such as via DVD disks. The MPEG-2 standard is typically used to compress video for home video distribution.

For the second highest quality encoding in prior systems, each frame of a film internegative 117 is scanned. Film print emulation 121 transforms the scanned images of the negative into corresponding positive images. These corresponding positive images are then resized 111, optionally color graded 113, and compressed 115 to create a version of the content encoded for home video distribution.

For the third highest quality encoding in prior systems, a positive film print 125, such as a distribution print is scanned 107 using a film scanner or more typically processed by a telecine 123. The telecine 123 uses a flying spot scanner to create an analog or digital video signal in real-time directly from a film print. The video signal is then digitized and compressed 115 to create a version of the content encoded for home video distribution.

This initial processing of film positives or negatives to create a compressed home video version of the content is typically performed by a film scanning facility 127. The compressed home video version of the content is then transported electronically or via a physical data storage media, such as magnetic disks or tapes, to a video processing facility 129.

The video processing facility 129 decompresses 131 the video content, resizes 133 the video content to the resolution, color, and pixel aspect ratio of a digital media device, referred to as the target device, and then recompresses 135 the content for electronic or physical transport to a content provider 137. Typically, the MPEG-2 standard is used to compress the content resized for the target device.

The content provider 137 (video content service provider) then decompresses 139 the content, optionally resizes 141 the content for one or more different target devices, and then recompresses 143 the content in a format suitable for distribution to the target device, such as MPEG-4 or h.264 format video, Microsoft Windows Media format video, or any other standard or proprietary video compression format. The result is content encoded for a target digital media device.

Because system 100 compresses the content multiple times using multiple lossy compression techniques, there is substantial loss in quality as the content is encoded for the target device. Moreover, MPEG-2 and MPEG-4 are block-based compression techniques that often add block boundary compression artifacts to the content. When content including block boundary compression artifacts is resized, these compression artifacts are exacerbated and often appear as unwanted halos or "mosquito noise," due to limitations of these compression techniques in handling high spatial frequency data.

Embodiments of the invention seek to improve the quality of content encoded for digital media devices by following two general guidelines. First, content is only resized or reformatted to lower resolutions. Resizing content from lower resolutions to higher resolutions should be avoided, as it unnecessarily discards data from the original content. Second, content should only be compressed using lossy compression once, if at all possible.

Figure 2:
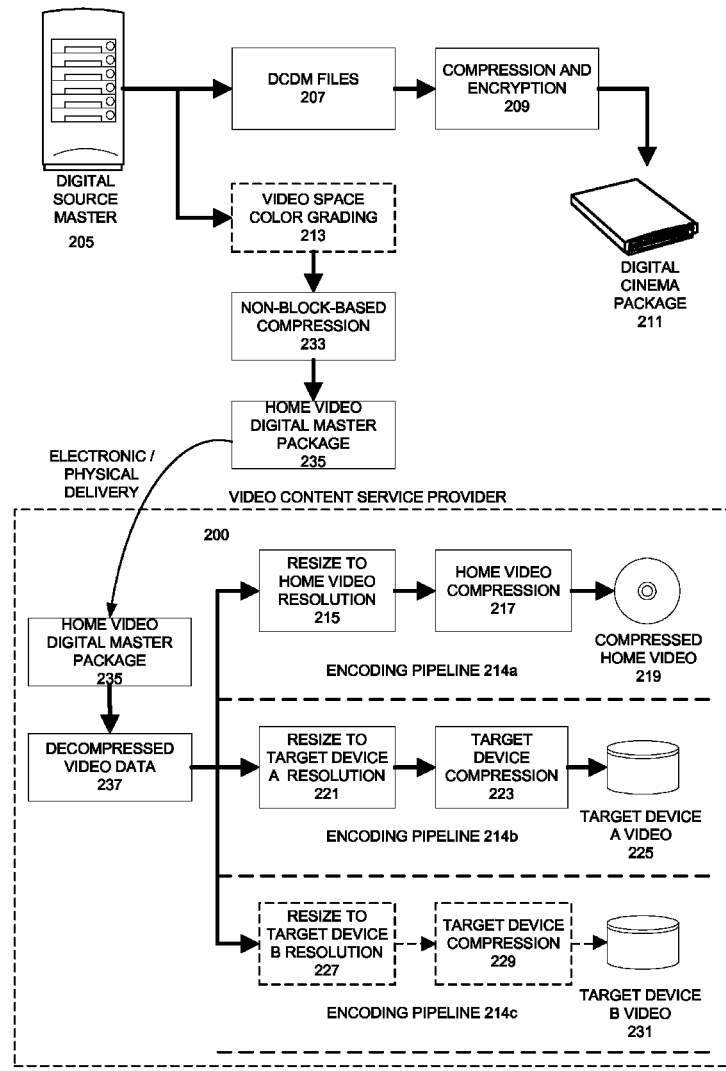
FIG. 2 illustrates a first system for encoding content for digital media devices according to an embodiment of the invention.

With these guidelines in mind, FIG. 2 illustrates a first system 200 for encoding content for digital media devices according to an embodiment of the invention. System 200 leverages the process used to encode and distribute content to digital cinemas. To distribute encode and distribute content to digital cinemas, a digital source master 205 is provided. A digital source master 205 is a master digital copy of the content. The digital source master 205 may be created by scanning each frame of a high quality film (e.g., acetate) version of the content, such as the interpositive print, an original camera negative print, or a positive film print. If the content was digitally recorded, then the digital source master 205 may be in the same format as it was recorded, created, or edited in.

Digital source masters 205 can be in a variety of resolutions and color formats, including 1920×1080 high definition resolution, Digital Cinema 2K (2048×1080) resolution, Digital Cinema 4K (4096×2160) resolution, or any other resolution used to create, process, and display digital images. Each pixel will typically be encoded with at least 24 bits of color information (8 bits each of the red, green, and blue color channels). Some digital source masters may use 14 bits, 16 bits, or even single-precision (32 bit) or double-precision (64 bit) floating point numbers for each color channel.

To distribute the content to digital cinema systems, the digital source master 205 is converted to a digital intermediate, e.g., Digital Cinema Distribution Master (DCDM) files 207. DCDM is one technical standard specified by the Digital Cinema Initiatives industry consortium, although other proprietary formats have been proposed. DCDM files 207 include uncompressed and unencrypted files that represent moving image content optimized for the electronic playback in theaters. DCDM files 207 typically use a hierarchical structure to represent content in a variety of different resolutions to meet the requirements of digital cinema projectors with different capabilities. Typical DCDM files are 4 to 6 terabytes (TB) in size.

Digital intermediates are unsuited for being used as an HVP for a variety of reasons. For example, each company in the industry typically has their own definition of how digital data is stored, what color encoding formats are used, what compression schemes are used, and the like for a digital intermediate. Additionally, for standard feature-length films, since these digital intermediates may be on the order or terabytes, it is impractical to send such digital intermediates for each feature to the many different video or media content service providers, e.g., Apple, Verizon, etc.

The DCDM files 207 are then compressed and encrypted 209 for distribution. Each frame of content in DCDM files 207 is typically compressed separately using lossless data compression, such as JPEG2000 lossless image compression. The compression may also reduce the color channel information down to 12 bits or less per channel of color information. Encryption is performed to prevent unauthorized copying of the content. The content is encrypted using an encryption key known to the digital cinema projectors, so that only these devices can read the content. Digital watermarks may also be added for additional security. The result of the compression and encryption 209 is a digital cinema package 211. The digital cinema package 211 can be distributed to theaters having the proper hardware decrypting projectors. Digital cinema packages 211 are often hundreds of gigabytes to terabytes in size and are typically distributed using portable hard disk drives. Alternatively, digital cinema packages 211 can be distributed over a local- and/or wide-area computer network, including the Internet.

Various embodiments of the present invention leverage the digital cinema mastering process to create high quality encoded content (HVP) for digital media devices regardless of their display requirements. Various embodiments of the invention also integrate easily with both legacy content sources, including film-based content sources, and more recently created digital sources.

To create high quality encoded content for digital media devices, system 200 optionally performs color grading 213 on the content from digital source master 205 in the target color space. Color grading maps the transfer curve of color expressed in the digital source master 205 to that of the target digital media device. In various embodiments, the color space is the HDTV color space, e.g., ITU-R BT.709, or the like. In various embodiments, the selected color-space ITU-R BT.709 can specify colors that cannot be produced by typical RGB monitors, displays, or the like (e.g., gamut mismatch). However, because ITU-R BT.709 preserves the color space data, the video service provider can perform gamut matching routines to fit within the desired target gamut. It is contemplated that any number of gamut matching techniques such as smooth gamut remapping, non-linear gamut remapping, or the like may be used. In various embodiments, without preservation of such color space data, gamut remapping operations may result in video data having distorted and/or unpleasing colors.

In various embodiments, the video data provided by the "digital intermediate" is also compressed in 233. In various embodiments, a spatially-independent compression scheme, such as a wavelet compression scheme is used. With conventional MPEG2 compression, used for home video content, e.g., HDTV, DVD, data are compressed at spatially dependent locations, such as blocks of 8×8 pixels. In contrast, JPEG2000, and other compression schemes do not break the data up into data blocks that are independently compressed. Because of this, if JPEG2000 compressed video data is re-sized or re-compressed, the artifacts will not be readily visible by users. Such compression schemes are also substantially free from small pixel-based shifts, as was illustrated in FIGS. 7A-D. This data is then used to form the HVP 235.

In various embodiments, the HVP is provided to the video service providers as a data source for their video processing pipeline via electronic mechanisms, e.g., internet, or via physical mechanisms, e.g., DVD (e.g., BluRay), hard disk.

As shown in FIG. 2, the video content service providers typically decompress HVP 235 to form uncompressed image data 237. In various embodiments, video content service providers may have any number of encoding pipelines to encode the data for the home video target "consumer" device, e.g., iTouch.

Encoding pipeline 214a resizes the HVP content to a home video resolution 215 and then compresses and optionally encrypts the resized content 217 to the required home video format. The result of the encoding pipeline 214a is content compressed for the home video format 219.

Similarly, encoding pipeline 214b encodes HVP 235 to the format of a first target digital media device. Encoding pipeline 214b resizes the content to the first target digital media device resolution 221 and then compresses and optionally encrypts the resized content 223 to the required first target digital media device format. The compressed content can optionally be encrypted and watermarked according to a first target digital media device digital rights management format to prevent unauthorized copying of the content. The result of the encoding pipeline 214b is content compressed for the first target digital media video format 225.

Encoding pipeline 214c encodes content from HVP 235 to the format of a second target digital media device. Encoding pipeline 214c resizes the content to the first target digital media device resolution 227 and then compresses and optionally encrypts the resized content 229 to the required second target digital media device format. The compressed content can optionally be encrypted and watermarked according to a second target digital media device digital rights management format to prevent unauthorized copying of the content. The result of the encoding pipeline 214c is content compressed for the first target digital media video format 231. In other embodiments, additional encoding pipelines, such as for providing streaming video, or the like are contemplated.

System 200 allows content to be encoded into any number of different formats. Each content format is derived directly from HVP 235, so there are no artifacts from repeated compression and decompression. Additionally, each different format is only scaled down, so the amount of information lost due to resizing is minimized. Because system 200 works with HVP 235, any film-based content that has been digitally scanned can be used as a source. Moreover, system 200 can directly use digitally-created content in its native format.

Figure 3:
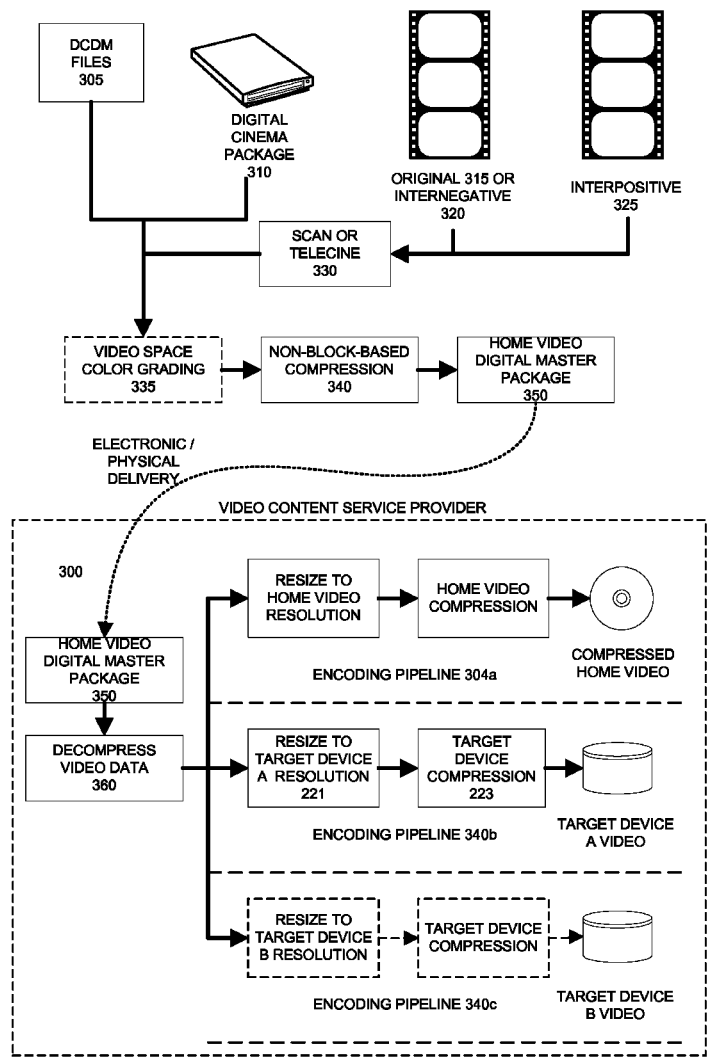
FIG. 3 illustrates a second system for encoding content for digital media devices according to an embodiment of the invention.

FIG. 3 illustrates a second system 300 for encoding content for digital media devices according to an embodiment of the invention. System 300 is similar to system 200, except that content can be provided in digital format as DCDM files 305 or a digital cinema package 310. Additionally, original print 315, internegative print 320, or interpositive print 325 film content can be digitally scanned using a film scanner or telecine 330 to produce a high resolution digital version of the content.

Regardless of the source, the digital version of the content can be optionally color graded 335. The color grading may be different depending upon the source of the content. similar to FIG. 2, and is typically graded in a home video color space. As illustrated, the image data is then compressed in a shift-resistant compression scheme 340, e.g., JPEG2000, to form the HVP 350.

In various embodiments, HPV 350 is then provided to a video or media content service provider. As shown, after decompression 360, the uncompressed data may be sent to any number of encoding pipelines 340, such as encoding pipelines 340*a*, 340*b*, and 340*c*. The encoding pipelines 340 are similar to encoding pipelines 214 discussed above. The output of the encoding pipelines 340 are versions of the content formatted for different target digital media device formats.

Figure 4:
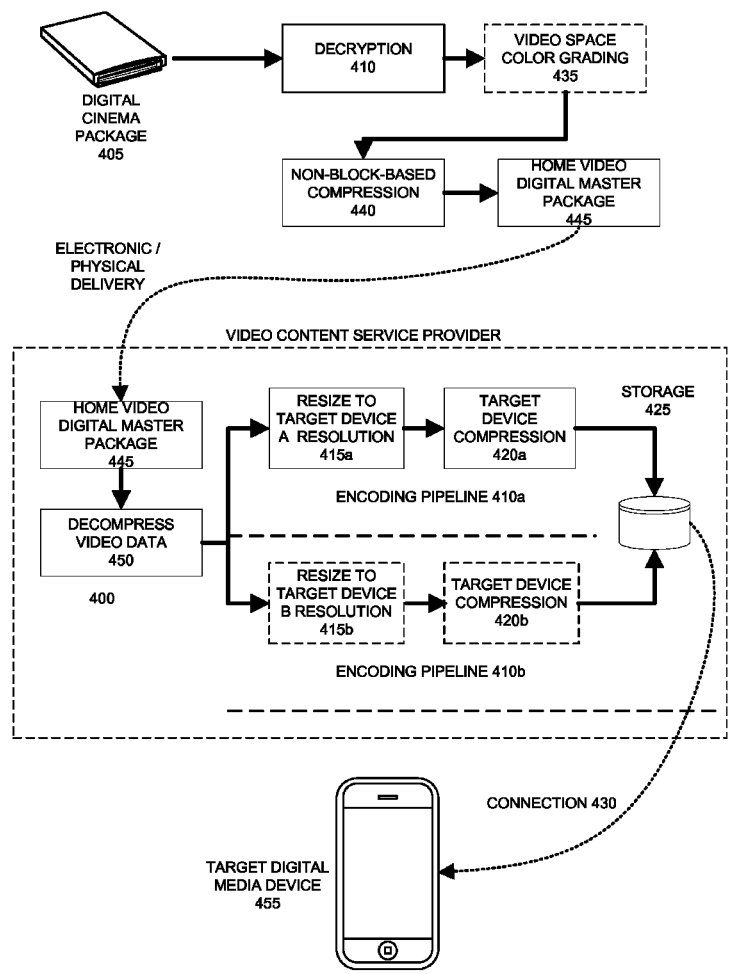
FIG. 4 illustrates a third system for encoding content for digital media devices according to an embodiment of the invention.

FIG. 4 illustrates a third system 400 for encoding content for digital media devices according to an embodiment of the invention. System 400 receives content via a digital cinema package 405. The content is decrypted using a decryption module 410 from the digital cinema package 405 to access the unencrypted content. In an embodiment the decryption module 410 operates in the same way that a digital cinema projector would access encrypted content from a digital cinema package. As illustrated, the data is typically color graded 435 to home video color space and then compressed using a non-block based compression scheme 440 to form the HVP 445. HVP 445 is provided to the video content service provider who then decompresses HVP 445 to obtain uncompressed image data 450.

The uncompressed image data is then provided to one or more encoding pipelines 410. System 400 includes encoding pipeline 410*a* and optional encoding pipeline 410*b*. Encoding pipeline 410*a* first resizes the content to a first target digital media device resolution 415*a* and then compresses and optionally encrypts the resized content 420*a* to the required first target digital media device format. The result of the encoding pipeline 410*a* is content compressed in a first target digital media device format 422*a*. The compressed content 422*a* is stored on a content provider server 425.

Similarly, encoding pipeline 410*b* can process HVP 450 by resizing 415*b* and compressing 420*b* into a second target digital media device format 422*b*. The compressed content 422*b* is also stored on a content provider server 425. This process can be repeated with any number for additional target digital media device formats.

Users can connect digital media devices 455 to the content provider server 425. The content provider server 425 identifies the content format best suited to a digital media device 455 and provides content encoded in this format to the digital media device 455.

In an embodiment, the connection 430 can include local-area data communications networks; wide-area data communications networks, such as the Internet; and closed or proprietary data communications networks, such as those provided by cellular phone carriers. The connection 430 can be comprised of both wired and wireless network adapters. In alternative embodiments, the digital media device 455 can connect to the content provider server 430 via one or more peer to peer connections with other intervening digital media devices. Intervening digital media devices may store local copies of all or a portion of the content encoded for one or more digital media devices.

In an embodiment, decryption 410 can be implemented as a device that is adapted to receive digital cinema packages 405 and corresponding decryption keys, similar to a digital cinema projector, and outputs content resized and compressed for one or more target digital media devices. The output of this device can then be stored on the content provider server 425.

Figure 5:
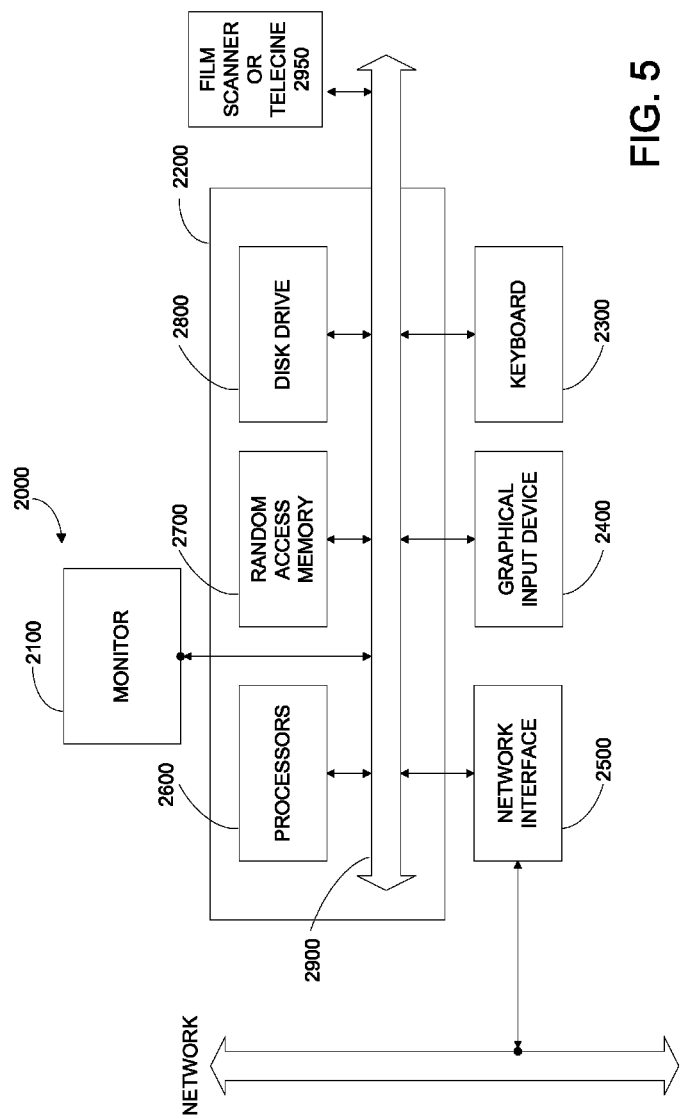
FIG. 5 illustrates a computer system suitable for implementing systems according to an embodiment of the invention.

FIG. 5 illustrates a computer system 2000 suitable for implementing an embodiment of the invention. Computer system 2000 typically includes a monitor 2100, computer 2200, a keyboard 2300, a user input device 2400, and a network interface 2500. User input device 2400 includes a computer mouse, a trackball, a track pad, graphics tablet, touch screen, and/or other wired or wireless input devices that allow a user to create or select graphics, objects, icons, and/or text appearing on the monitor 2100. Embodiments of network interface 2500 typically provides wired or wireless communication with an electronic communications network, such as a local area network, a wide area network, for example the Internet, and/or virtual networks, for example a virtual private network (VPN).

Computer 2200 typically includes components such as one or more processors 2600, and memory storage devices, such as a random access memory (RAM) 2700, disk drives 2800, and system bus 2900 interconnecting the above components. Processors 2600 can include one or more general purpose processors and optional special purpose processors for processing video data, audio data, or other types of data. RAM 2700 and disk drive 2800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices. Disk drive 2800 can include one or more hard disk drives connected to the computer 2200 via an internal connection, such as parallel or serial ATA, or via an external connection, such as iSCSI or other storage area network standards. Disk drive 2800 can use redundancy, such as a RAID subsystem, to improve performance, data integrity, and drive uptime. Computer 2200 can optionally connect with film scanners, telecines, or other devices adapted to convert content from film to a digital format.

Figure 6:
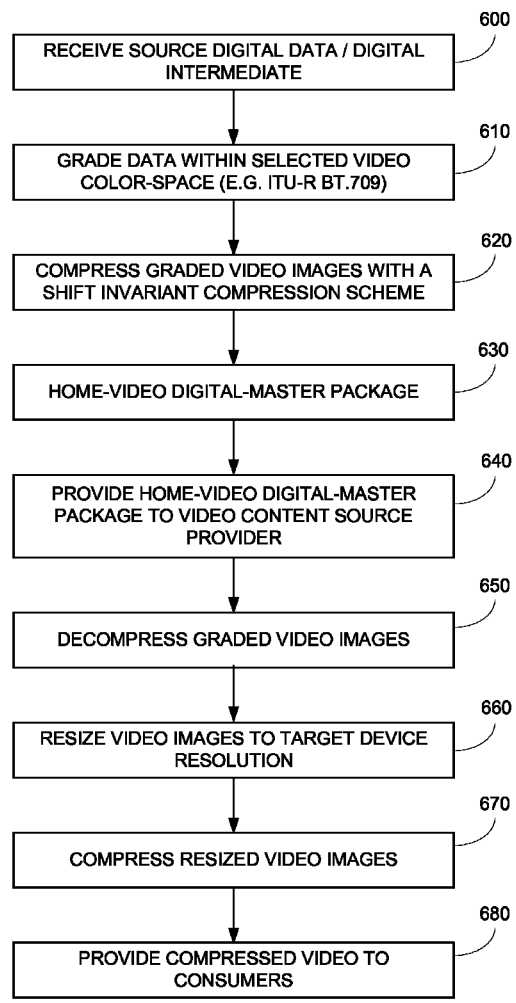
FIG. 6 illustrates a flow chart according to various embodiments of the present invention.
Figures 7C, 7D:
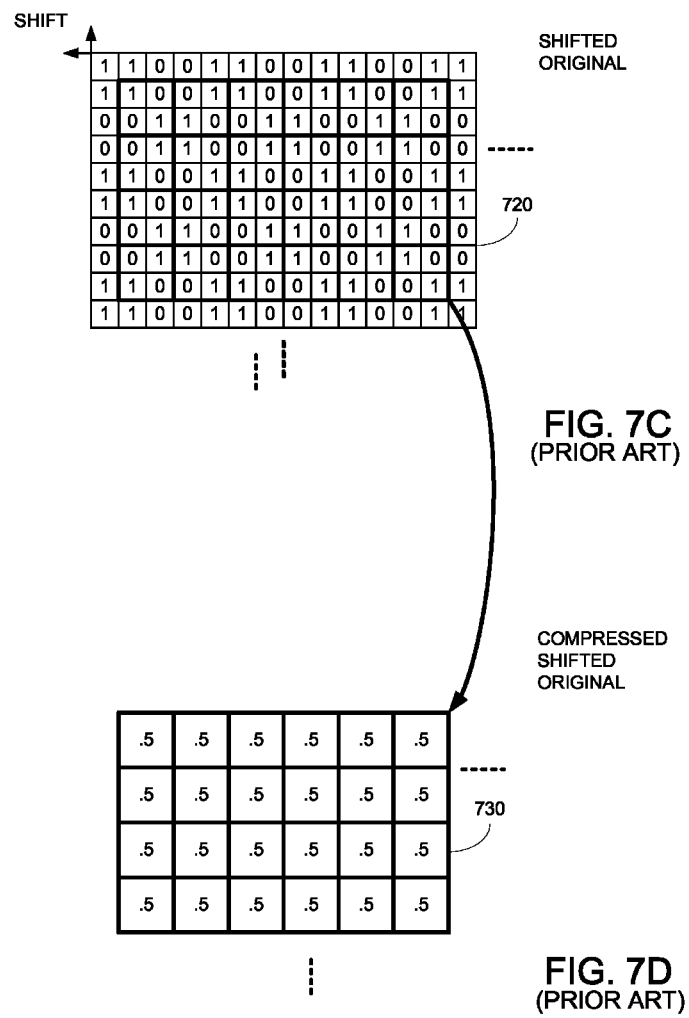

FIG. 6 illustrates a flow diagram according to various embodiments of the present invention. As was discussed, initially digital source data from any number of sources is provided, step 600. In various embodiments, the color space of the digital source data may be a color space for film media, for digital cinema systems, DCDM encoding, an unambiguous color space such as X'Y'Z', a device independent color space, or the like. The source data is then color graded into the color space of the contemplated target consumer devices, step 610. In various embodiments, the color space is HDTV, ITU-R BT.709, ITU-R BT.601, or the like.

Next, the images are compressed using a shift tolerant compression scheme, e.g., wavelet, JPEG2000, or the like, step 620. As discussed above, such compression schemes are typically tolerant of integer pixel shifts of the input image. In contrast, as was illustrated in FIGS. 7B and 7D, typical compression schemes can produce very different compressed images although the images in FIGS. 7A and 7C were only shifted by one pixel horizontally and vertically.

In various embodiments, the HVP is formed and stored (e.g., archived), step 630. In various embodiments, HVP 630 is not intended to be viewed, but is a digital data package that is stored and is provided to independent third parties (e.g., video content service providers), who are typically located at remote locations. For example, one party that generates the HVP may be located in Burbank, Calif. and the third party may be located in Cupertino, Calif.

In various embodiments, HVP 630 is then provided to the video or media content service provider, e.g., DVD publishers, Apple (iTunes), Verizon, or the like. As discussed above, this process may be an electronic transfer (e.g., network), a physical transfer (e.g., hard disk), or the like.

In FIG. 6, the video content service provider typically decompresses HVP 630, reversing step 620, step 650. The uncompressed images are resized to match the desired device resolution, step 660, (e.g., from approximately 2048×1080 to 640×480). Next, the resized images are then compressed, step 670. As discussed above, typical consumer compression schemes may include any conventional compression scheme such as MPEG-2, DivX, MPEG-4, H.264, WMV, RealVideo, or any other lossy or lossless compression scheme. The resulting data may be stored and provided to consumers, step 680, using conventional methods (e.g., iTunes download, Flash video stream, DVD, Blu-Ray Disc, HD DVD, Streaming video, or the like).

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

In light of the above, it can be seen that the HVP provides many benefits over the current methods of providing video data to video or media content service providers and subsequently to consumers. Specifically, extraneous color encodings and decodings are reduced, and thus spatial artifacts due to compression schemes and resizing are reduced.

What is claimed is:

1. A method comprising:
    receiving, at one or more computer systems associated with a first video provider, a home-video digital master package generated by a second video provider based on content digitally mastered according to at least one digital cinema video format such that the home-video digital master package packages together a plurality of digital images color graded to map a transfer curve of color expressed in the content to that of at least one consumer high-definition video format while preserving color space data of the content and encoded with a compression encoding substantially independent of integer pixel translation of the plurality of digital images;
    performing, with one or more processors associated with the one or more computer systems, gamut matching on the plurality of digital images packaged in the home-video digital master package to remap the color of the plurality of digital images expressed in the at least one consumer high-definition video format to that of at least one consumer high-definition target device;
    generating, with the one or more processors associated with the one or more computer systems, video data configured for playback on the at least one consumer high-definition target device based on results of the gamut matching performed on the plurality of digital images packaged in the home-video digital master package; and
    store the generated video data in a storage device associated with the one or more computer systems.

2. The method of claim 1 wherein performing, with the one or more processors associated with the one or more computer systems, the gamut matching on the plurality of digital images packaged in the home-video digital master package comprises performing smooth gamut remapping or non-linear gamut remapping.

3. The method of claim 1 wherein performing, with the one or more processors associated with the one or more computer systems, the gamut matching on the plurality of digital images packaged in the home-video digital master package comprises performing gamut matching to fit the color space of the plurality of digital images within a desired gamut of the at least one consumer high-definition target device.

4. The method of claim 1 wherein the compression encoding excludes a block-based encoding or comprises a wavelet encoding, Joint Photographic Experts Group 2000 (JPEG2000) encoding, or a lossless encoding.

5. The method of claim 1 further comprising resizing, with the one or more processors associated with the one or more computer systems, each of the plurality of images from a first resolution associated with the home-video digital master package to a second resolution associated with the at least one consumer high-definition target device with reduced pixel artifacts.

6. The method of claim 1 wherein to map the transfer curve of the color expressed in the content to that of the at least one consumer high-definition video format while preserving color space data of the content comprises color grading to a color space defined by International Telecommunication Union Radio communication Sector (ITU-R) BT.709 or ITU-R BT.601.

7. The method of claim 1 wherein to map the transfer curve of the color expressed in the content to that of the at least one consumer high-definition video format while preserving color space data of the content comprises color grading from a color space associated with film media, a color space associated with digital cinema, a device independent color space, an unambiguous color space, an x-prime y-prime z-prime (X'Y'Z') color space, or Digital Cinema Distribution Master (DCDM) encoding.

8. The method of claim 1 wherein the at least one consumer high-definition target device is selected from a group consisting of: a DVD player, a Blu-Ray disk player, an HD-DVD disk player, a computer, a CD player, a hand-held device, a telephone.

9. The method of claim 1 wherein each step is implemented by a system comprising the one or more computer systems according to a set of instructions stored on a non-transitory memory in communication with the one or more processors associated with the one or more computer systems.

10. The method of claim 1 wherein each step is implemented by the one or more computer systems according to code stored on a non-transitory computer-readable media that is executed by the one or more processors to configure the processor to perform the step.

11. The method of claim 1 wherein the compression encoding excludes a block-based encoding or comprises a wavelet encoding, Joint Photographic Experts Group 2000 (JPEG2000) encoding, or a lossless encoding.

12. The method of claim 1 further comprising
resizing, with the one or more processors associated with the one or more computer systems, each of the plurality of images from a first resolution associated with the content to a second resolution associated with the home-video digital master package with reduced pixel artifacts.

13. The method of claim 1 wherein generating, with the one or more processors associated with the one or more computer systems, the plurality of digital images comprises color grading to a color space defined by International Telecommunication Union Radio communication Sector (ITU-R) BT.709 or ITU-R BT.601.

14. The method of claim 1 wherein generating, with the one or more processors associated with the one or more computer systems, the plurality of digital images comprises color grading from a color space associated with film media, a color space associated with digital cinema, a device independent color space, an unambiguous color space, an x-prime y-prime z-prime (X'Y'Z') color space, or Digital Cinema Distribution Master (DCDM) encoding.

15. A method comprising:
receiving, at one or more computer systems associated with a first content provider, content digitally mastered by a second content provider according to at least one digital cinema video format;
generating, with one or more processors associated with the one or more computer systems, a plurality of digital images color graded to map a transfer curve of color expressed in the content to that of at least one consumer high-definition video format while preserving color space data of the content such that gamut matching performed on the plurality of digital images remaps the color of the plurality of digital images expressed in the at least one consumer high-definition video format to that of at least one consumer high-definition target device;
generating, with the one or more processors associated with the one or more computer systems, a home-video digital master package that encodes the plurality of digital images with a compression encoding substantially independent of integer pixel translation of the plurality of digital images; and
storing the home-video digital master package in a storage device associated with the one or more computer systems such that video data generated based on the home-video digital master package is configured for playback on the at least one target consumer high-definition device in response to results of the gamut matching performed on the plurality of digital images obtained from the home-video digital master package.

16. The method of claim 15 wherein generating, with the one or more processors associated with the one or more computer systems, the home-video digital master package comprises packaging the plurality of digital images such that performing the gamut matching on the plurality of digital images packaged in the home-video digital master package comprises performing smooth gamut remapping or non-linear gamut remapping.

17. The method of claim 15 wherein generating, with the one or more processors associated with the one or more computer systems, the home-video digital master package comprises packaging the plurality of digital images such that performing the gamut matching allows fitting the color space of the plurality of digital images within a desired gamut of the at least one target consumer high-definition device.

18. A method for distributing digital video data, the method comprising:
receiving, at one or more computer systems associated with a first video service provider, an encoded image data package that includes a first plurality of digital images at a first resolution in first digital data compressed with a compression encoding substantially independent of integer pixel translation of the first plurality of digital images, the encoded image data package generated by a second video service provider based on second digital data that includes a second plurality of digital images at a second image resolution, wherein each digital image in the second plurality of digital images is encoded in a first color space configured for playback on cinema video equipment, wherein each digital image in the first plurality of digital images is encoded in a second color space configured for playback on high-definition consumer video equipment;
generating, with one or more processors associated with the one or more computer systems, third digital data comprising a third plurality of digital images at a third image resolution based on the encoded image data package, wherein each digital image in the third plurality of digital images in the third digital data is color-graded in a color space targeted to at least one high-definition consumer device according to color grading input data in the encoded image data package preserving the second color space;
configuring, with the one or more processors associated with the one or more computer systems, the third digital data for distribution and playback on the at least one targeted high-definition consumer device; and
storing the configured third digital data in a storage device associated with the one or more computer systems.

19. The method of claim 18 further comprising:
reducing pixel artifacts on the at least one targeted high-definition consumer device in response to resizing, with the one or more processors associated with the one or more computer systems, each of the first plurality of digital images from the first resolution to the third resolution.

20. The method of claim 18 further comprising:
performing, with the one or more processors associated with the one or more computer systems, gamut matching on the first plurality of digital images to remap color of the first plurality of digital images expressed to that the of at least one targeted high-definition consumer device.

* * * * *